(12) United States Patent
Choi et al.

(10) Patent No.: US 12,388,366 B2
(45) Date of Patent: Aug. 12, 2025

(54) CONVERTER CONTROL DEVICE AND CONTROLLING METHOD

(71) Applicants: HYUNDAI MOTOR COMPANY, Seoul (KR); KIA CORPORATION, Seoul (KR)

(72) Inventors: Min Seong Choi, Daejeon (KR); Jin Young Yang, Hanam-si (KR); In Yong Yeo, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 807 days.

(21) Appl. No.: 17/696,206

(22) Filed: Mar. 16, 2022

(65) Prior Publication Data

US 2023/0030897 A1    Feb. 2, 2023

(30) Foreign Application Priority Data

Jul. 27, 2021   (KR) .................. 10-2021-0098631

(51) Int. Cl.
| | | |
|---|---|---|
| H02M 3/158 | (2006.01) | |
| B60L 53/22 | (2019.01) | |
| B60L 53/53 | (2019.01) | |
| B60L 58/20 | (2019.01) | |
| H02J 7/00 | (2006.01) | |
| H02J 7/34 | (2006.01) | |

(52) U.S. Cl.
CPC .......... *H02M 3/158* (2013.01); *B60L 53/22* (2019.02); *B60L 53/53* (2019.02); *B60L 58/20* (2019.02); *H02J 7/0013* (2013.01); *H02J 7/0047* (2013.01); *H02J 7/342* (2020.01); *B60L 2210/12* (2013.01); *B60L 2240/547* (2013.01)

(58) Field of Classification Search
CPC ..................................................... H02M 3/158
USPC ............................................................. 320/103
See application file for complete search history.

(56) References Cited

U.S. PATENT DOCUMENTS

| | | | |
|---|---|---|---|
| 2005/0151508 A1* | 7/2005 | Cook ................. | H02J 7/1492 320/116 |
| 2008/0036419 A1* | 2/2008 | Cook ................. | H02J 7/0031 320/103 |
| 2011/0025125 A1* | 2/2011 | Brabec ............... | H02J 7/0071 307/9.1 |

FOREIGN PATENT DOCUMENTS

KR    10-1514914 B1    4/2015

\* cited by examiner

*Primary Examiner* — Jerry D Robbins
(74) *Attorney, Agent, or Firm* — MCDONNELL BOEHNEN HULBERT & BERGHOFF LLP

(57) ABSTRACT

Disclosed are a converter control device and a control method including a first switching element connected to each end of at least one first battery, a second switching element connected to the other end of the first battery and connected in series with the first switching element, a third switching element connected to one end of a second battery, a fourth switching element connected to the other end of the second battery and connected in series with the third switching element, an inductor connected to a first node between the first switching element and the second switching element and a second node between the third switching element and the fourth switching element, and a duty controller to receive each first voltage that is a voltage value of each end of the first battery and a second voltage that is a voltage value of one end of the second battery, and to output duty of the respective first switching element based on the first voltage and the second voltage.

15 Claims, 4 Drawing Sheets

CONVERTER CONTROL DEVICE AND CONTROLLING METHOD

CROSS REFERENCE TO RELATED APPLICATIONS

The present application claims priority to Korean Patent Application No. 10-2021-0098631, filed Jul. 27, 2021 the entire contents of which is incorporated herein for all purposes by this reference.

BACKGROUND

Field

The present disclosure relates to a converter control device and a control method, and more particularly, a converter control device and a control method capable of simplifying a package and improving efficiency in connecting other batteries for supplying power to a main battery for driving a mobility by additionally connecting a switching element to the input terminal of the converter rather than supplying power by connecting the switching elements and converters suitable for the number of the other batteries to the main battery, respectively.

Description of the Related Art

Mobility, including vehicles, may be driven through the output of batteries. For such mobility driving, a charger (OBC: On Board Charger) using commercial AC power for charging a high voltage battery is installed inside the vehicle. An OBC is generally composed of a PFC circuit that corrects the power factor of commercial AC power and a DC/DC converter that converts a link capacitor voltage to the voltage required by the battery. When such a battery is operated alone, the capacity increases rapidly, which increases the weight of the mobility, lowering fuel efficiency and increasing the cost of the battery. As a way to solve this problem, there is a configuration in which one or a plurality of swappable batteries preemptively charge the main battery rather than the OBC. By using such an alternating battery, it is possible to reduce the capacity of the main battery, thereby reducing the cost, and increasing an average mileage and motor/inverter output.

Each of the main battery and the alternating battery may have the same maximum voltage, but have a voltage in a variable range according to a status of charge (SOC) of the battery. Therefore, if they are connected in a simple short circuit structure, there is a risk of fire and component damage due to voltage difference. Therefore, in order to use the alternating battery to charge the main battery, one DCDC converter is additionally required in general for each alternating battery, which increases the cost and size, and reduces the efficiency. Therefore, there is a need for a converter control device to improve this.

The matters described as the background art are only for improving the understanding of the background of the present disclosure, and should not be accepted as acknowledging that they correspond to the prior art already known to those of ordinary skill in the art.

SUMMARY

The present disclosure is proposed to solve the above problem, and the present disclosure provides a converter control device and a control method capable of simplifying a package and improving efficiency in connecting other batteries for supplying power to a main battery for driving a mobility by additionally connecting a switching element to the input terminal of the converter rather than supplying power by connecting the switching elements and converters suitable for the number of the other batteries to the main battery, respectively.

The converter control device according to the present disclosure includes a first switching element connected to each end of at least one first battery, a second switching element connected to the other end of the first battery and connected in series with the first switching element, a third switching element connected to a first end of a second battery, a fourth switching element connected to a second end of the second battery and connected in series with the third switching element, an inductor connected to a first node between the first switching element and the second switching element and a second node between the third switching element and the fourth switching element, and a duty controller to receive each first voltage that is a voltage value of each end of the first battery and a second voltage that is a voltage value of the first end of the second battery, and to output duty of the respective first switching element based on the first voltage and the second voltage.

The duty controller may receive an average of the second voltage for a predetermined time, and detect the duty of the respective first switching element based on an average of the first voltage and the second voltage.

There may be a plurality of first batteries and first switching elements, the first switching elements are connected to each other at a third node between one end of each the first switching elements, and the first node and the converter control device may further include a switch to perform one-way conduction in a direction of the first switching element at one end of the first battery between one end of each first battery and each first switching element.

The duty controller may not output the duty when all the respective first voltage is lower than the second voltage.

The duty controller may output the duty when at least one of the respective first voltage is higher than the second voltage.

The duty controller may output the duty of the respective first switching element so that a third voltage, which is a voltage value of the first node outputted as the first voltage and the duty of the respective switching element, is equal to the second voltage.

The duty controller may output the duty of the first switching element through Equation 1.

$$\sum_{k=1}^{n}(V_k \times V_{S1k}) = V_{B2} \quad \text{Equation 1}$$

Here, $V_k$ is the respective first voltage, $V_{s1k}$ is the duty of the respective switching element, and $V_{B2}$ is the second voltage.

The duty controller may output the duty of the respective first switching element to operate in a buck mode based on the first voltage and the second voltage.

In a method of controlling a converter by converting a voltage of at least one first battery and transferring the voltage to a second battery, the converter control method according to the present disclosure includes measuring a respective first voltage that is a voltage value of each end of the first battery and a second voltage that is a voltage value of one end of the second battery by a voltage meter, and outputting a duty of a respective first switching element that is correspondingly connected to each end of the first battery based on the first voltage and the second voltage measured by a duty controller.

In the step of outputting the duty, a plurality of the first switching elements is connected to each other at a third node between one ends of the first switching elements and a first node, a switch between one end of each first battery of a plurality of the first batteries and the respective first switching element may perform one-way conduction in a direction of the first switching element at one end of the first battery.

In the step of outputting the duty, the duty may not be output when all the respective first voltage is lower than the second voltages.

In the step of outputting the duty, the duty may be output when at least one of the respective first voltage is higher than the second voltage.

In the step of outputting the duty, the duty of each of the first switching elements may be output so that a third voltage, which is a voltage value of the first node outputted as the first voltage and the duty of the respective switching element, is equal to the second voltage.

In the step of outputting the duty, the duty of the first switching elements may be output through Equation 1.

$$\sum_{k=1}^{n}(V_k \times V_{S1k}) = V_{B2} \qquad \text{Equation 1}$$

Here, $V_k$ the respective first voltage, $V_{S1k}$ is the duty of the respective first switching element, $V_{B2}$ is the second voltage.

In step of outputting the duty, the duty of each of the first switching elements may be output so as to operate in a buck mode based on the first voltage and the second voltage.

The converter control device and the control method of the present disclosure can simplify a package and improve efficiency in connecting other batteries for supplying power to a main battery for driving a mobility by additionally connecting a switching element to the input terminal of the converter rather than supplying power by connecting the switching elements and converters suitable for the number of the other batteries to the main battery, respectively.

DETAILED DESCRIPTION

Specific structural or functional descriptions of the embodiments of the present disclosure disclosed in this specification or application are only exemplified for the purpose of describing the embodiments according to the present disclosure, and the embodiments according to the present disclosure may be implemented in various forms, and should not be construed as being limited to the embodiments described in the present specification or application.

Hereinafter, embodiments of the present disclosure will be described in detail with reference to the accompanying drawings.

Figure 1:
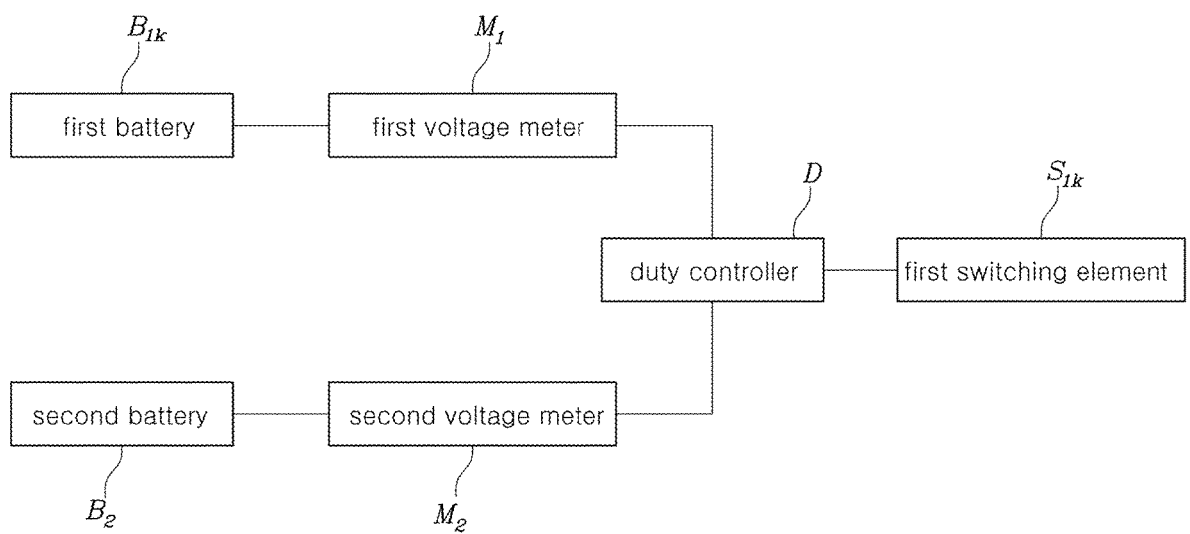
FIG. 1 is a block diagram showing a converter control device according to an embodiment of the present disclosure.
Figure 2:
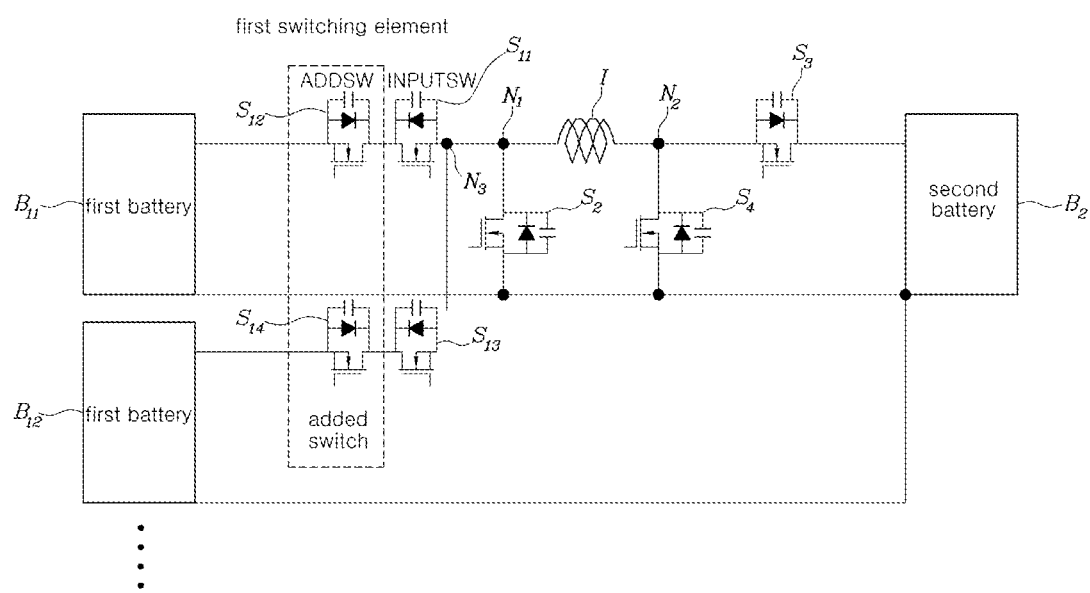
FIGS. 2 to 3 are views showing a converter control device according to an embodiment of the present disclosure.
Figure 3:
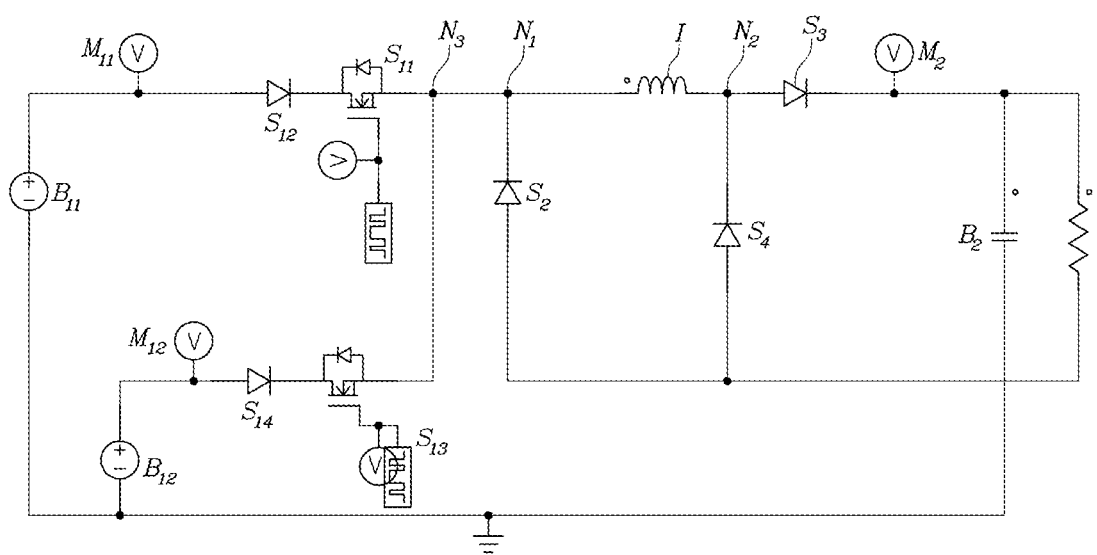
Figure 4:
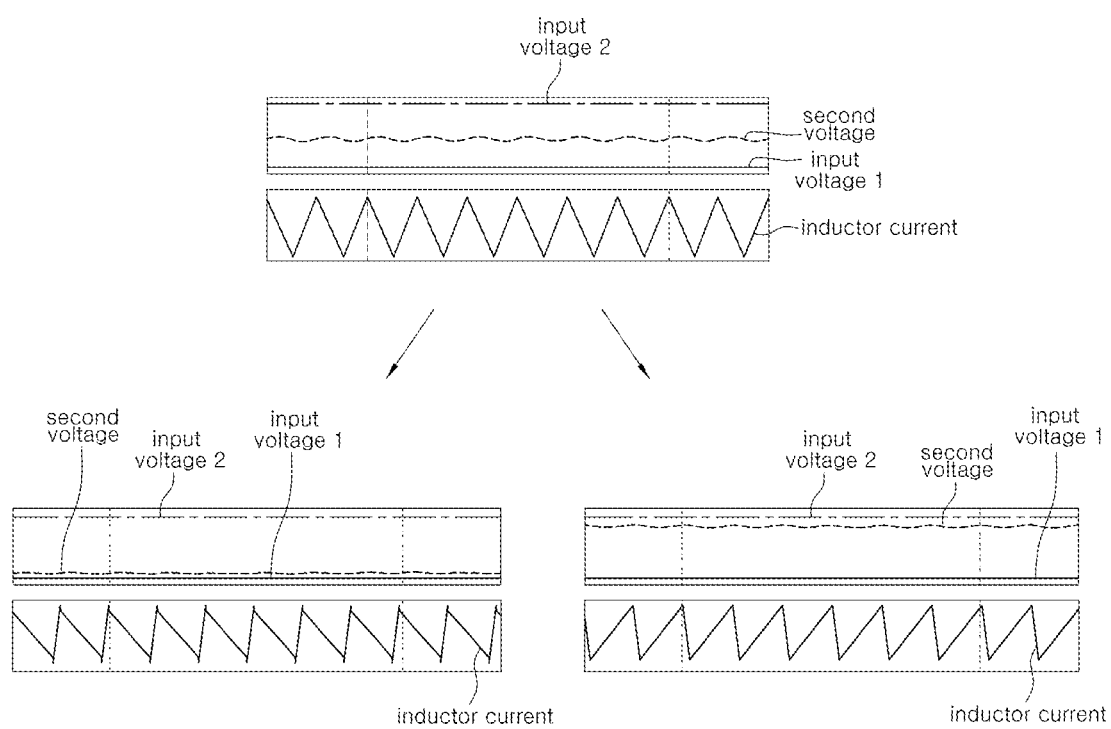
FIG. 4 shows a graph showing an operation result and control method of a converter control device according to an embodiment of the present disclosure.

FIG. 1 is a block diagram showing a converter control device according to an embodiment of the present disclosure, FIGS. 2 to 3 are views showing a converter control device according to an embodiment of the present disclosure, and FIG. 4 shows a graph showing an operation result and control method of a converter control device according to an embodiment of the present disclosure.

FIG. 1 is a block diagram showing a converter control device according to an embodiment of the present disclosure. The converter control device is configured to include a convertor including first switching elements $S_{11}$ and $S_{13}$ each correspondingly connected to each end of at least one first battery $B_{1k}$ to supply power to a second battery $B_2$, a voltage meter M including a first voltage meter $M_1(M_{11}, M_{12})$ and a second voltage meter $M_2$ measuring a first voltage of the first battery and a second voltage of the second battery, and a duty controller D to control the duty of the first switching elements $S_{11}$ and $S_{13}$.

The converter control device according to the embodiment of the present disclosure of FIG. 1 is a device required for a system for charging other battery with a plurality of batteries. In FIG. 1, the voltage meter M receives the second voltage and at least one first voltage constituting an input voltage to transmit them to the duty controller D. The duty controller D controls the duty based on the first voltage and the second voltage, particularly the difference between the two voltages.

FIG. 2 is a view showing a converter control device according to an embodiment of the present disclosure, and the converter control device includes the first switching elements $S_{11}$, $S_{13}$ each correspondingly connected to a first end of the at least one first battery $B_{1k}$, a second switching element $S_2$ connected to a second end of the first battery and connected in series with the first switching elements, a third switching element $S_3$ connected to a first end of the second battery, a fourth switching element $S_4$ connected to a second end of the second battery and connected in series with the third switching element, an inductor I connected between a first node $N_1$ between the first switching elements $S_{11}$, $S_{13}$ and the second switching element $S_2$ and a second node $N_2$ between the third switching element $S_3$ and the fourth switching element $S_4$, and the duty controller D to receive each of the first voltages that is a voltage value of each end of the first battery and the second voltage that is a voltage value of a first end of the second battery and to output the duty of each of the first switching elements based on the first voltages and the second voltage.

The converter control device according to an embodiment of the present disclosure includes a controller for a DC-DC converter. In particular, the controller for a DC-DC converter includes the first to fourth switching elements ($S_{1k}$, $S_2$, $S_3$, $S_4$). The inductor may be connected between the first node and the second node to convert power as a converter.

Here, the first and second switching elements that are the switching elements on the first battery side, and the third and fourth switching elements that are the switching elements on the second battery side may be an asynchronous DC-DC convert such as diodes (Schottky, etc.) and transistors (MOSFETs, etc.) or an alternating switching transistor and a synchronous DC-DC converter. In particular, the synchronous DC-DC converter may include the duty controller D that controls the duty of the switching device to prevent cross switching.

As a conventional converter control device, a converter mounted on an electric vehicle may be a converter for charging a high-voltage battery such as a battery that generates a driving output of a motor. However, the converter included in the On Board Charger (OBC) for charging the second battery $B_2$ of an electric vehicle may directly supply the output from an AC power source to the second battery $B_2$, which is a high voltage battery to be charged. Meanwhile, the OBC may include a capacitor or the first battery $B_{1k}$ for supplying power to the second battery.

In this case, in principle, the first battery $B_{1k}$ and the second battery $B_2$ may be designed to receive or supply the same level of voltage for stability of voltage supply. In this case, the voltage of the battery may be lowered or raised to a certain level depending on the state of charge (SOC) and the state of health (SOH) according to the number of times of charge and discharge. Therefore, simply connecting the first battery $B_{1k}$ and the second battery $B_2$ is a short-circuit structure and causes component damage and fire risk. In addition, if the second battery $B_2$ supplies an unstable voltage to the motor due to this, a situation in which the motor malfunctions or over-operates or the motor characteristics are deteriorated may also occur. Therefore, a DC-DC converter, which is a buck-boost converter, is necessarily required for a device for supplying power between batteries.

However, since the conventional disclosure additionally requires a buck-boost converter corresponding to the first battery, whenever the number of first batteries is increased, a corresponding buck-boost converter is connected to the second battery side, that is, to an output terminal. Accordingly, in the conventional disclosure, the number of switches and inductors included in the buck-boost converter arithmetically increases. Therefore, the conventional disclosure has a problem in that the weight increases whenever the number of first batteries is increased, and the efficiency of driving the battery and the vehicle is reduced.

In particular, according to an embodiment of the present disclosure, in the converter connecting one or more of the first batteries and the second battery, the duty of the first switching element corresponding to the first battery is output based on the first voltage and the second voltage so the power conversion is controlled. That is, according to an embodiment of the present disclosure, a short circuit due to a voltage difference is prevented by adjusting the duty in consideration of the voltage difference between the first voltage of each first battery and the second voltage of the second battery.

In addition, in the embodiment of the present disclosure, only the first switching element is correspondingly added without significantly increasing the number of switches and inductors despite the increase in the number of first batteries. Accordingly, the capacity and weight of the package for charging the second battery can be simplified, thereby increasing the output density and enhancing price competitiveness. In addition, according to the embodiment of the present disclosure, the overall reduction in the number of switching elements may increase the overall efficiency of the vehicle system driven by the second battery.

In addition, the duty controller according to the embodiment of the present disclosure may receive an average of the second voltage for a predetermined time, and may output the duty of the respective first switching element based on the average of the first voltage and the second voltage. As described above, the voltage of the battery is preset and designed, but it is flexible depending on the amount of charge and the deterioration state. Here, it is preferable that the average is a moving average for a certain time immediately before the measurement or an average of the accumulated voltage for a certain period. By controlling the duty of the first switching element based on the value representing the second voltage and the first voltage, it is possible to secure a stable voltage in the embodiment of the present disclosure.

FIG. 2 is a view showing a converter control device according to an embodiment of the present disclosure, and there are a plurality of first batteries and a plurality of first switching elements. The first switching elements are connected to each other at a third node $N_3$ between a first end of each of the first switching elements and the first node $N_1$, a switch configured to perform one-way conduction in the direction of the first switching element may be further included at a first end of the first battery between one end of the respective first battery and the respective first switching element.

In the conventional disclosure, in connecting the additional first battery to the second battery, the output terminal of the second battery, which is an output side, is connected to the fourth node between the third switching element and one end of the second battery and the fifth node between the fourth switching element and the other end of the second battery. Accordingly, the conventional disclosure causes a problem in that the number of switches, in particular, the number of inductors increases. In order to solve this problem, in the embodiment of the present disclosure, the first switching elements include additional switches $S_{12}$ and $S_{14}$ whenever the number of the first batteries is increased, in addition to the existing switching elements $S_{11}$ and $S_{13}$. Accordingly, the embodiment of the present disclosure reduces the number of additional switches and inductors by connecting the first switching elements including the additional switches to the third node and connecting them to the second battery side. Also, according to the embodiment of the present disclosure, as one-way conduction in the direction of the first switching elements is performed at a first end of the first battery, the input voltage is determined as the sum of the switched-on voltage and the switched-off voltage according to each duty of the respective first switching element. Thus, it has the efficiency as a single mode of the buck converter as well.

FIG. 3 is a view illustrating a converter control device according to the embodiment of the present disclosure, and the duty controller D may not output the duty when all the respective first voltages are lower than the second voltage. Also, the duty controller D may output the duty when at least one of the first voltages is higher than the second voltage. In addition, the duty controller D may output the duty of the respective first switching element so that the third voltage, which is a voltage value of the first node output from the first voltage and the duty of the respective switching element, is equal to the second voltage.

$$\sum_{k=1}^{n}(V_k \times Vs_{1k}) = V_{B2} \qquad \text{Equation 1}$$

Here, $V_k$ is the respective first voltages, $V_{s1k}$ is the duty of the respective first switching element, and $V_{B2}$ is the second voltage.

The first voltage is a voltage of each of the first batteries connected in parallel, and is a variable that determines the input voltage from the viewpoint of charging the second battery. In addition, the input voltage is finally determined according to each duty of the respective switching element output based on these variables. Accordingly, the embodiment of the present disclosure includes a buck-boost converter, but may be implemented in all of the buck mode, the boost mode, and the buck-boost mode according to the magnitude comparison of the first voltage and the second voltage. However, a single mode would be best in terms of efficiency or circuit operation. In particular, in the embodiment of the present disclosure, since the input voltage may be determined as the sum of the switched-on voltage and the switched-off voltage according to each duty of the respective first switching element, it may be preferable to be implemented in the buck mode. Accordingly, the embodiment of the present disclosure reduces the inefficiency caused by being implemented in various modes including the buck-boost mode, through the control that excludes a case in which all the first voltage are lower than the second voltage, includes only the case of step-down of the first voltage, is set equal to the third voltage (concept of input voltage).

FIG. 4 is a graph illustrating an operation result and a control method of a converter control device according to an embodiment of the present disclosure, and the duty controller D may output the duty of the first switching elements through Equation 1. Also, the duty controller D may output the duty of each of the first switching elements $S_{11}$ and $S_{13}$ to operate in the buck mode based on the first voltages and the second voltage.

In FIG. 4, the first to the third figures will be described in common. In a top graph, a horizontal axis represents time and a vertical axis represents the input voltage 1 and the input voltage 2, which are the first voltages, and the measured value of the second voltage, assuming that the number of the first batteries 2. In the graphs below, a horizontal axis represents time, and a vertical axis represents the current of the inductor I. Here, the duty was output through Equation 1, and the duty was set so that the sum of the duties of the respective switching elements becomes 1.

Accordingly, as shown in the top figure of FIG. 4, when the second voltage is set to an intermediate level of the respective first voltages, each duty is to be output and controlled to have the same or similar value. Here, the second figure of FIG. 4 shows the duty control when the second voltage is decreased, and the third figure shows the duty control when the second voltage is increased. As shown in the second or third figure of FIG. 4, when the second voltage is set close to the minimum or maximum value of the first voltage, the duty of one battery is to be output and controlled in a direction biased toward being high. However, in common, the embodiment of the present disclosure operates as a buck single mode that is step-down higher than the maximum value of the first voltage. As described above, the converter control device according to the embodiment of the present disclosure outputs each duty of the first switching element even in a situation in which the second voltage is variable and controls it according to Equation 1 or the buck mode to stabilize the operation voltage of the switching element.

Here, the switching element includes BJT, Silicon Controlled Rectifier (SCR), TRIAC, Unijunction Transistor (UJT), Programmable Unijuunction Transistor (PUT), Junction Field Effect Transistor (JFET), Gate Turn Off Thyristor (GTO), MOS Controlled Thyrister (MCT), Injection-Enhanced Gate Transistor (IEGT), Integrated Gate Bipolar Transistor (IGBT), Integrated Gate Commutated Thyrister (IGCT), MOSFET, and Intelligent Power Device (IPD: semiconductor switch). The switch may correspond to a switching element and any one of a switching element and a resistance element such as a mechanical fuse, a mechanical relay, a diode device and the like. In addition, the converter here is a DC-DC converter, and in particular, for high efficiency and high output, the switching element may be a synchronous converter in which four transistors alternatively switching, rather than diodes, are used.

In a method of controlling a converter that converts the voltage of at least one first battery and transfers the voltage to the second battery, the converter control method according to the present disclosure includes the steps of measuring a respective first voltage that is a voltage value of each end of the first battery and a second voltage that is a voltage value of a first end of the second battery by the voltage meter, and outputting a duty of a respective first switching element that is correspondingly connected to each end of the first battery based on the first voltage and the second voltage measured by the duty controller.

In the step of outputting the duty, a plurality of the first switching elements are connected to each other at a third node between first ends of the first switching elements and a first node, a switch between a first end of each first battery of a plurality of the first batteries, and the respective first switching element may perform one-way conduction in a direction of the first switching element at the first end of the first battery. In addition, the duty is not output when all the respective first voltage is lower than the second voltages. In addition, the duty may be output when at least one of the respective first voltage is higher than the second voltage. Next, in the step of outputting the duty, the duty of each of the first switching elements may be output so that a third voltage, which is a voltage value of the first node outputted as the first voltage and the duty of the respective switching element, is equal to the second voltage. Further, in the step of outputting the duty, the duty of the first switching elements may be output through Equation 1. Lastly, in step of outputting the duty, the duty of each of the first switching elements may be output so as to operate in a buck mode based on the first voltage and the second voltage.

The converter control device and control method according to the embodiment of the present disclosure relates to a control device and a control method for a converter that connects another battery for supplying power to a main battery for driving mobility. In the conventional disclosure, the number of switches and inductors included in the buck-boost converter arithmetically increases as the number of other batteries increases. Therefore, the conventional disclosure has a problem in that the weight increases whenever the number of first batteries is increased, and the efficiency of driving the battery and the vehicle is reduced.

In particular, the embodiment of the present disclosure controls power conversion by outputting the duty of the first switching elements corresponding to the first batteries based on the first voltages and the second voltage in a converter connecting one or more of the first batteries and the second battery. Accordingly, it is possible to simplify the capacity and weight of the package for charging the second battery, thereby increasing the output density, increasing price competitiveness, and furthermore, increasing the efficiency of the entire vehicle system driven by the battery.

Although shown and described with reference to specific embodiments of the present disclosure, it will be apparent to those of ordinary skill in the art that the present disclosure can be variously improved and changed without departing from the spirit of the present disclosure provided by the following claims.

The invention claimed is:

1. A converter control device comprising:
   at least one first battery having a first end and a second end;
   a first switching element connected to the first end of the at least one first battery;
   a second switching element connected to the second end of the first battery, and connected in series with the first switching element;
   a second battery having a first end and a second end;
   a third switching element connected to the first end of the second battery;
   a fourth switching element connected to the second end of the second battery and connected in series with the third switching element;
   an inductor connected to a first node positioned between the first switching element and the second switching element, and connected to a second node positioned between the third switching element and the fourth switching element;
   a duty controller configured to receive each first voltage that is a voltage value of the first end of the first battery and a second voltage that is a voltage value of the first end of the second battery, and configured to output duty of the first switching element based on the first voltage and the second voltage; and
   a plurality of first batteries and a plurality of first switching elements.

2. The converter control device according to claim 1, wherein the duty controller is configured to receive an average of the second voltage for a predetermined time, and is configured to detect the duty of the first switching element based on an average of the first voltage and the second voltage.

3. The converter control device according to claim 1, wherein the converter control device further comprises a switch to perform one-way conduction in a direction of the first switching element at the first end of each of the plurality of first batteries between the first end of each first battery and each first switching element.

4. The converter control device according to claim 1, wherein the duty controller does not output the duty when all of the first voltages are lower than the second voltage.

5. The converter control device according to claim 1, wherein the duty controller outputs the duty when at least one of the first voltages is higher than the second voltage.

6. The converter control device according to claim 1, wherein the duty controller outputs the duty of the first switching element so that a third voltage, which is a voltage value of the first node outputted as the first voltage and the duty of the respective switching element, is equal to the second voltage.

7. The converter control device according to claim 1, wherein the duty controller outputs the duty of the first switching element through the equation $$\sum_{k=1}^{n}(V_k \times V_{s1k}) = V_{B2},$$

where $V_k$ is the first voltage, $V_{s1k}$ is the duty of the respective switching element, and $V_{B2}$ is the second voltage.

8. The converter control device according to claim 1, wherein the duty controller outputs the duty of the first switching element to operate in a buck mode based on the first voltage and the second voltage.

9. A method of controlling a converter by converting voltages of a plurality of first batteries and transferring the voltages to a second battery, the method comprising the steps of:
   Measuring first voltages that are voltage values of each first end of the plurality of first batteries, and a second voltage that is a voltage value of a first end of the second battery by a voltage meter; and
   Outputting duties of a plurality of first switching elements, each of which is connected to a first end of a corresponding one of the plurality of first batteries based on the first voltages, and the second voltage measured by a duty controller.

10. The method of controlling a converter according to claim 9, wherein in the step of outputting the duties, a plurality of the first switching elements are connected to each other at a third node between a first end of each of the plurality of first switching elements and a first node, and
   a switch between a first end of each first battery of a plurality of first batteries and the each first switching element performs one-way conduction in a direction of the first switching element positioned at a first end of each of the first batteries.

11. The method of controlling a converter according to claim 9, wherein in the step of outputting the duty, the duty is not output when all of the first voltages are lower than the second voltage.

12. The method of controlling a converter according to claim 9, wherein in the step of outputting the duty, the duty is output when at least one of the first voltages are higher than the second voltage.

13. The method of controlling a converter according to claim 9, wherein in the step of outputting the duty, the duty of each of the first switching elements is output so that a third voltage, which is a voltage value of the first node outputted as the first voltages and the duty of the respective switching elements, is equal to the second voltage.

14. The method of controlling a converter according to claim 9, wherein in the step of outputting the duty, the duty of the first switching elements is output through the equation:

$$\sum_{k=1}^{n}(V_k \times V_{s1k}) = V_{B2},$$

where $V_k$ is the first voltage, $V_{s1k}$ is the duty of the respective first switching element, and $V_{B2}$ is the second voltage.

15. The method of controlling a converter according to claim 9, wherein in the step of outputting the duty, the duty of each of the first switching elements is output so as to operate in a buck mode based on the first voltage and the second voltage.

* * * * *